United States Patent
Bax

(10) Patent No.: US 7,672,965 B2
(45) Date of Patent: Mar. 2, 2010

(54) FINITE-STATE MACHINE AUGMENTED FOR MULTIPLE EVALUATIONS OF TEXT

(75) Inventor: Eric Theodore Bax, Altadena, CA (US)

(73) Assignee: Avaya, Inc., Basking Ridge, NJ (US)

( * ) Notice: Subject to any disclaimer, the term of this patent is extended or adjusted under 35 U.S.C. 154(b) by 575 days.

(21) Appl. No.: 10/775,745

(22) Filed: Feb. 9, 2004

(65) Prior Publication Data

US 2004/0215595 A1    Oct. 28, 2004

Related U.S. Application Data

(60) Provisional application No. 60/449,008, filed on Feb. 24, 2003.

(51) Int. Cl.
*G06F 17/00* (2006.01)
(52) U.S. Cl. .................. 707/102; 707/3; 716/1; 326/121; 381/61
(58) Field of Classification Search .......... 707/1; 716/1; 326/121; 381/61; 718/107; 711/122, 711/130; 702/181
See application file for complete search history.

(56) References Cited

U.S. PATENT DOCUMENTS

| | | | | |
|---|---|---|---|---|
| 5,630,130 | A * | 5/1997 | Perotto et al. | 718/107 |
| 5,721,939 | A * | 2/1998 | Kaplan | 704/9 |
| 6,453,254 | B1 * | 9/2002 | Bullwinkel et al. | 702/81 |
| 7,020,850 | B2 * | 3/2006 | Raghavan et al. | 716/1 |
| 7,039,166 | B1 * | 5/2006 | Peterson et al. | 379/88.18 |
| 7,072,880 | B2 * | 7/2006 | Beesley | 707/2 |
| 2004/0098549 | A1 * | 5/2004 | Dorst | 711/167 |
| 2004/0172234 | A1 * | 9/2004 | Dapp et al. | 704/1 |
| 2005/0283363 | A1 * | 12/2005 | Weng et al. | 704/257 |

* cited by examiner

*Primary Examiner*—Sathyanarayan Pannala
(74) *Attorney, Agent, or Firm*—Douglas Grover

(57) ABSTRACT

A process performs multiple evaluations of text simultaneously. There are multiple counters, each with pattern-amount pairs. The pattern-amount pairs are accumulated into a single finite-state machine, with each state having a list of (counter, value) pairs instead of a single value. While the finite-state machine is applied to text, a score for each counter is accumulated by summing values for the counter from value lists of visited states. With one state transition per character, evaluating text using one finite-state machine for multiple counters is more efficient than using separate finite-state machines for counters or patterns.

4 Claims, 2 Drawing Sheets

EXAMPLE OF AUGMENTED FINITE-STATE MACHINE

EXAMPLE OF AUGMENTED FINITE-STATE MACHINE

FINITE-STATE MACHINE AUGMENTED FOR MULTIPLE EVALUATIONS OF TEXT

CROSS REFERENCE TO RELATED APPLICATIONS

This application claims the benefit of U.S. Provisional Application No. 60/449,008, filed on Feb. 24, 2003.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

A text is a sequence of symbols or items. Each symbol or item is called a character. The set of all possible characters for a domain is called the alphabet. One example domain is texts that are news stories represented in computer memory, with the ASCII character set as the alphabet. Another example domain is texts that are genetic sequences represented on a computer hard disk, with the alphabet consisting of characters A, C, G, and T.

A pattern specifies a set of character sequences. The set may be as simple as a single sequence, e.g., {GACACT}. Alternatively, the set of sequences may be more complex, e.g., "any sequence that begins with GAC, then has an intermediate sequence with length a multiple of three, then ends with ACT."

A counter contains one or more pattern-amount pairs. For example, a counter corresponding to baseball news may contain patterns such as the word "baseball" and the phrase "relief pitcher". The amount for each pattern may correspond to how strongly the pattern indicates that a text is on the topic of baseball. The score for a counter on a text, starting at a position in the text, is the sum over counter patterns of the amounts associated with the patterns that occur in the text starting at the specified start position. The score for a counter on a text is the sum of counter scores at start positions. The start positions are determined by the domain. For example, for news the start of each word may be a start position. So if the counter pattern-amount pairs are ("ball", 0.5) and ("relief pitcher", 2.0) and the text is "The relief pitcher threw the ball," then the score is 2.5.

Computing the counter score for a text is called counter evaluation. A counter may be evaluated using a finite-state machine. A finite-state machine contains states. There is a specified start state. The machine transitions from state to state based on the sequence of characters in the text. The rules for transitions from a state may be represented as a list of pairs, each of the form (character, next state). Each pair is called a transition. When the machine is in the state and encounters a character in a pair, the machine transitions to the next state indicated by the pair. If the encountered character is not in any transition from the state, then the machine halts. Each state has a value. For a finite-state machine representing a counter, the value for a state reached immediately upon encountering one or more counter patterns is the sum of amounts corresponding to the patterns, and the values for other states are zero. To perform a counter evaluation, apply the machine corresponding to the counter starting at each start position in the text. Transition from state to state based on the character sequence, accumulating in a sum the value of each state that the machine visits.

A multi-counter contains a set of counters. The score for a multi-counter on a text is a list of scores for the counters in the multi-counter. Computing the multi-counter score for a text is called multi-counter evaluation. Multi-counter evaluation is useful to evaluate a news text for relevance to a set of topics, with each counter corresponding to a topic. Depending on topic relevance, a news story may be forwarded to people interested in the story. Also, the combination of topic scores may be used to evaluate when there is a shift in the focus of news. Multi-counter evaluation is useful to search a genetic sequence for indications that the sequence codes different protein families, with each counter corresponding to a protein family and each pattern corresponding to a code for a substructure commonly found among proteins of the family.

One method of multi-counter evaluation is to perform counter evaluations in sequence for each counter in the multi-counter. Another method is to use multiple computational resources to perform two or more counter evaluations at once. The first method is relatively slow, and the second method is relatively resource-intensive.

SUMMARY OF THE INVENTION

The invention is a method to perform multi-counter evaluation. Multiple counters correspond to a single finite-state machine, augmented with state value lists instead of state values. Each state value list indicates which counter scores receive which values for the state. To perform multi-counter evaluation, the augmented finite-state machine is applied to text, transitioning from state to state based on the text character sequence. State scores are accumulated separately for each counter, producing a list of counter scores. This method allows multiple counters to be evaluated simultaneously using a single computational resource. The method is faster than evaluating each counter in sequence, and it is less resource-intensive than simultaneous counter evaluations using multiple computational resources.

DETAILED DESCRIPTION OF PREFERRED EMBODIMENTS

Figure 1:
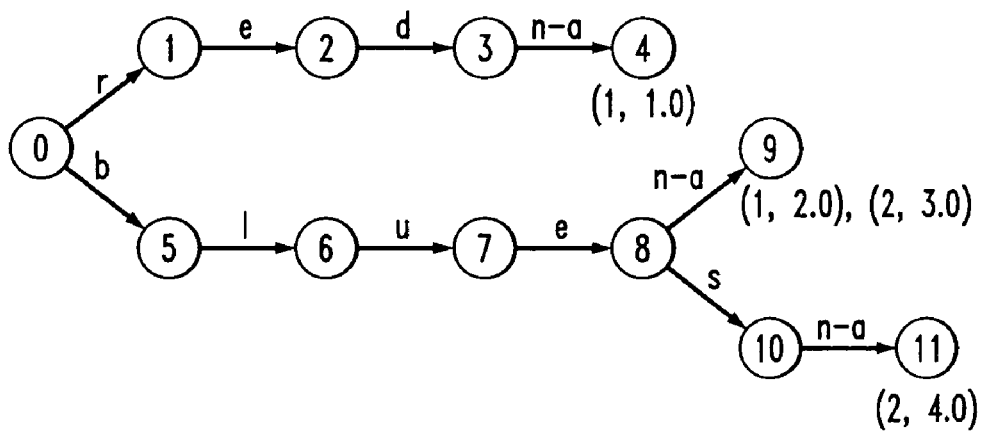
FIG. 1 is a diagram representing a finite-state machine augmented with state value lists.

The description begins with an example of combining finite-state machines for two counters to form an augmented finite-state machine for both counters. Next, methods to construct and apply an augmented finite-state machine for multi-counter evaluation are described. Then there are descriptions of variations on construction, scoring, and implementation.

Example

In the news domain, patterns may consist of words or phrases. A word or phrase consists of a specified sequence of characters followed by any non-alphanumeric character. The following is a finite-state machine for a counter with word-amount pairs (red, 1.0) and (blue, 2.0). Note that state 0 is the start state each finite-state machine in this description. Also note that a single transition with the set of characters "non-alphanumeric" is used as shorthand for a collection of transitions—one for each non-alphanumeric character and all having the same next state.

| state | Transitions | value |
|---|---|---|
| 0 | (r, 1), (b, 5) | 0.0 |
| 1 | (e, 2) | 0.0 |
| 2 | (d, 3) | 0.0 |
| 3 | (non-alphanumeric, 4) | 0.0 |
| 4 |  | 1.0 |
| 5 | (1, 6) | 0.0 |
| 6 | (u, 7) | 0.0 |
| 7 | (e, 8) | 0.0 |
| 8 | (non-alphanumeric, 9) | 0.0 |
| 9 |  | 2.0 |

The finite-state machine can be applied to the start of the text "red wagon" as follows.

1. Start in state 0 with score 0.0. Start at the first character in the text, which is "r".
2. The text character is "r", so search for "r" in the transitions from state 0. There is a transition (r, 1), so set the state to 1.
3. Advance by one character in the text to "e". Search for "e" in the transitions from state 1. There is a transition (e, 2), so set the state to 2.
4. Advance by one character in the text to "d". Search for "d" in the transitions from state 2. There is a transition (d, 3), so set the state to 3.
5. Advance by one character in the text to the space character. Search the transitions from state 3 for the space character. There is a transition (non-alphanumeric, 4), and the space character is non-alphanumeric, so set the state to 4.
6. The value for state 4 is 1.0, so add 1.0 to the score. Advance by one character to "w". Search the transitions from state 4 for "w". Since there are no transitions with "w", halt.

The following is a finite-state machine for a counter with word-amount pairs (blue, 3.0) and (blues, 4.0).

| state | Transitions | value |
|---|---|---|
| 0 | (b, 1) | 0.0 |
| 1 | (1, 2) | 0.0 |
| 2 | (u, 3) | 0.0 |
| 3 | (e, 4) | 0.0 |
| 4 | (non-alphanumeric, 5), (s, 6) | 0.0 |
| 5 |  | 3.0 |
| 6 | (non-alphanumeric, 7) | 0.0 |
| 7 |  | 4.0 |

The two finite-state machines can be combined to form the following augmented finite-state machine for a multi-counter containing the two counters. (The first counter is counter 1, and the second counter is counter 2.)

| state | Transitions | value list |
|---|---|---|
| 0 | (r, 1), (b, 5) |  |
| 1 | (e, 2) |  |
| 2 | (d, 3) |  |
| 3 | (non-alphanumeric, 4) |  |
| 4 |  | (1, 1.0) |
| 5 | (1, 6) |  |
| 6 | (u, 7) |  |
| 7 | (e, 8) |  |
| 8 | (non-alphanumeric, 9), (s, 10) |  |
| 9 |  | (1, 2.0), (2, 3.0) |
| 10 | (non-alphanumeric, 11) |  |
| 11 |  | (2, 4.0) |

The resulting augmented finite-state machine is shown in FIG. 1. This augmented finite-state machine corresponds to a multi-counter that contains two counters, a counter 1 and a counter 2. Counter 1 contains pattern "red" with value 1.0 and pattern "blue" with value 2.0. Counter 2 contains pattern "blue" with value 3.0 and pattern "blues" with value "4.0." The abbreviation "n-a" represents any non-alphanumeric character.

The augmented finite-state machine can be applied to the start of the text "blue sky" as follows.

1. Start in state 0 with scores 0.0 for counter 1 and 0.0 for counter 2. Start at the first character in the text, which is "b".
2. The text character is "b", so search for "b" in the transitions from state 0. There is a transition (b, 5), so set the state to 5.
3. Advance by one character in the text to "1". Search for "1" in the transitions from state 5. There is a transition (l, 6), so set the state to 6.
4. Advance by one character in the text to "u". Search for "u" in the transitions from state 6. There is a transition (u, 7), so set the state to 7.
5. Advance by one character in the text to "e". Search for "e" in the transitions from state 7. There is a transition (e, 8), so set the state to 8.
6. Advance by one character in the text to the space character. Search for the space character in the transitions from state 8. There is a transition (non-alphanumeric, 9), so set the state to 9.
7. According to the value list for state 9, add 2.0 to the score for counter 1, and add 3.0 to the score for counter 2. Advance by one character in the text to the character "s". Search for "s" in the transitions from state 9. Since there is no transition for "s", halt.

FIG. 1 illustrates an example of an augmented finite-state machine. The illustrated machine corresponds to a multi-counter that contains two counters, a counter 1 and a counter 2. Counter 1 contains pattern "red" with value 1.0 and pattern "blue" with value 2.0. Counter 2 contains pattern "blue" with value 3.0 and pattern "blues" with value "4.0." The abbreviation "n-a" represents any non-alphanumeric character.

Figure 2:
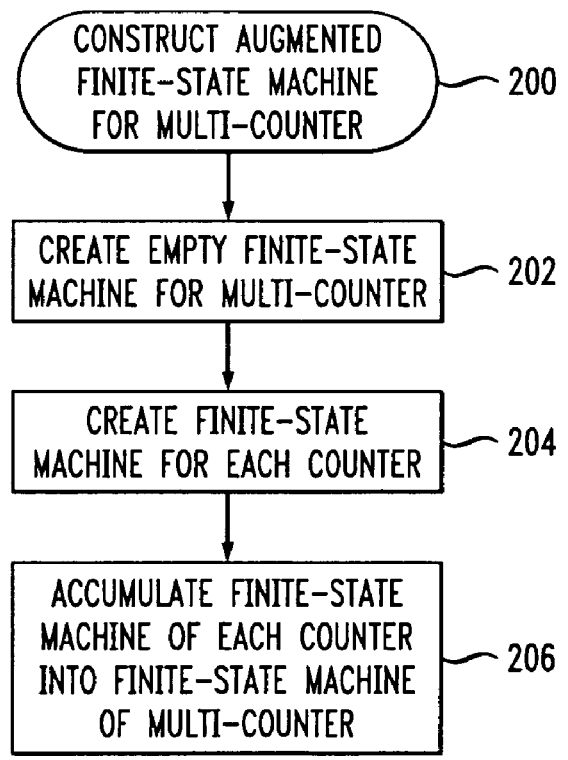
FIG. 2 is a diagram representing creation of an augmented finite-state machine for a multi-counter.

Constructing an Augmented Finite-State Machine (FIG. 2)

One method to construct an augmented finite-state machine that corresponds to a multi-counter (step 200) is to begin with an empty augmented finite-state machine (step 202) and accumulate each finite-state machine that corresponds to pattern-amount pairs into the augmented finite-state machine (step 206). The initial empty augmented finite-state machine has only a start state, with no transitions and no value list. Use standard computer science methods to create a finite-state machine for each pattern (step 204), placing the associated amount as the value for "halt" or "success" states.

To add to an augmented finite-state machine x a pattern-amount finite-state machine (step 206), use the following recursive algorithm, with initial call merge(start state x, start state y). States of the merged machine correspond to pairs of states that can be reached by starting each machine x and y in the start state and applying the machines to a text in unison, with each machine advancing through each text character simultaneously. Also, some states of the merged machine may correspond to one machine having halted while the other continues to advance through text. This situation is denoted by using "halt" in place of a state in the following algorithm. The algorithm maintains a list of merged machine states. The list is initially empty. The list is indexed by the pair of machine x and y states corresponding to each merged machine sates. When the algorithm completes, the list contains all states of the augmented finite-state machine that merges machine x with machine y.

merge(state x, state y)
1) If the state corresponding to (state x, state y) is in the list of created states, then return that state, and do not continue to the following steps. Otherwise, create a new state corresponding to (state x, state y); add the new state to the list of created states, and continue to the following steps.
2) Fill in the value list for the new state as follows. If state x has a value list, then copy the value list to form the value list for the new state. If state y has value and the new state has no value list, then form a new empty value list for the new state. If state y has value, then add (number of counter containing pattern for machine y, amount of pattern) to the value list for the new state.
3) Make transitions from the new state as follows. For each character in transitions from state x or state y:
   a) If the character is in a transition from state x, then set destination x to the destination of that transition. Otherwise set destination x to "halt."
   b) If the character is in a transition from state y, then set destination y to the destination of that transition. Otherwise set destination y to "halt."
   c) Make a transition from the new state to merge(destination x, destination y).

The algorithm forms states, state value lists, and state transitions for the merged machine, as follows.

Form states:
   Form states for the merged machine that correspond to pairs of states that can be reached by starting the finite-state machine and augmented finite-state machine in the start states and applying the machines to a text in unison, with each machine advancing through each text character simultaneously.
   Form states for the merged machine that correspond to one machine having halted while the other continues to advance through text.

Form state value lists:
   For each merged machine state, if there is a corresponding augmented finite-state machine state and it has a value list, then copy the value list to form the value list for the new state.
   For each merged machine state, if there is a corresponding finite-state machine state; it has value, and the merged machine state has no value list, then form a new empty value list for the merged machine state.
   For each merged machine state, if there is a corresponding finite-state machine state and it has value, then add a reference to the counter corresponding to the finite-state machine and the value to the value list for the merged machine state.

Form state transitions:
   For each merged machine state with a corresponding augmented finite-state machine state and a corresponding finite-state machine state, for each character in transitions from both states, form a transition for the merged machine state, with destination the merged machine state corresponding to the states that are the destinations of the transitions.
   For each merged machine state with a corresponding augmented finite-state machine state and a corresponding finite-state machine state, for each character in a transition from only one of the corresponding states, form a transition for the merged machine state, with destination the merged machine state corresponding to the state that is the destination of the transition and the machine without the transition having halted.
   For each merged machine state with a corresponding augmented finite-state machine state or a corresponding finite-state machine state but not both, for each character in a transition from the corresponding state, form a transition for the merged machine state, with destination the merged machine state corresponding to the state that is the destination of the transition and the machine without the transition having halted.

Figure 3:
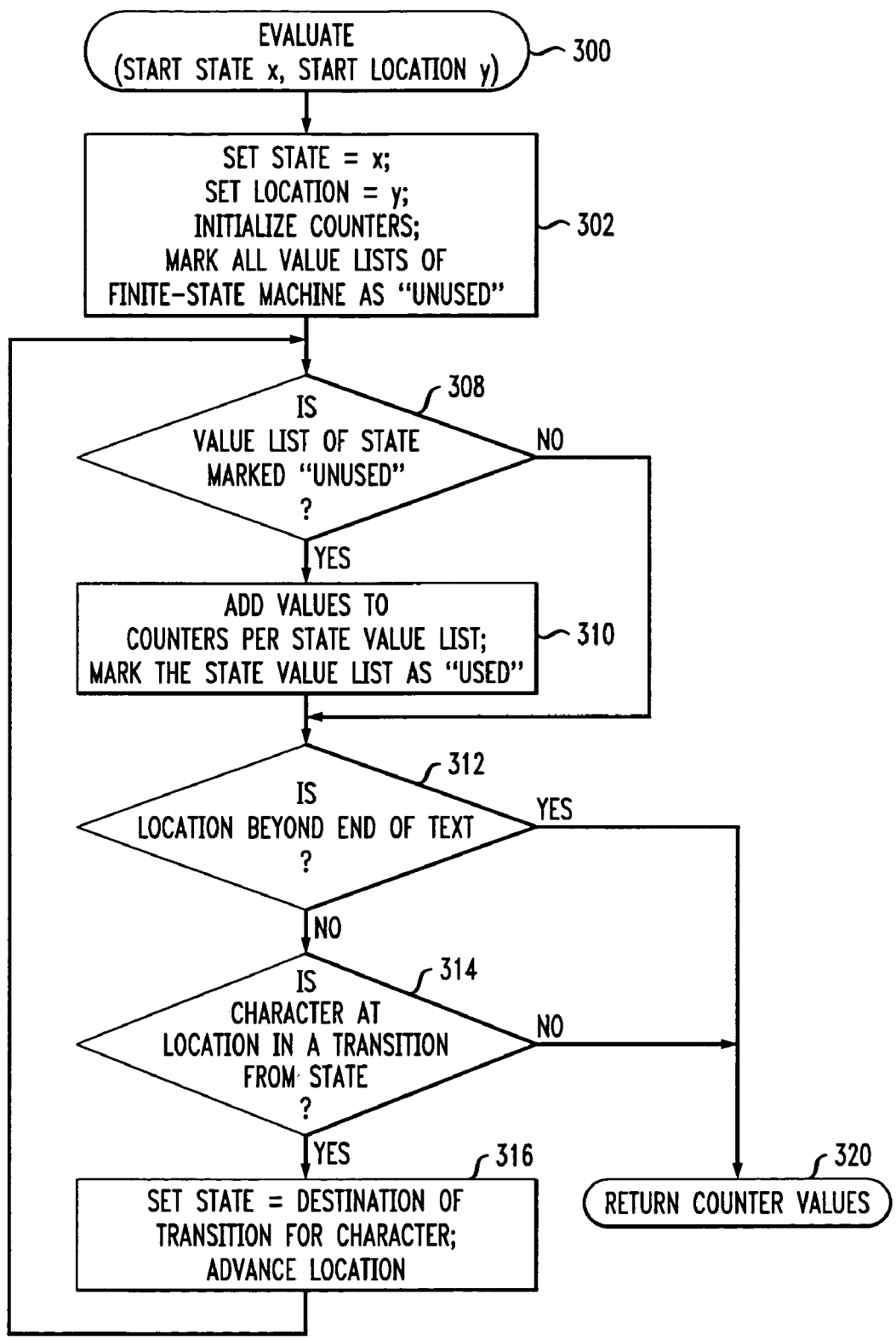
FIG. 3 is a diagram representing use of the augmented finite-state machine for a multi-computer for evaluation of a text.

Using an Augmented Finite-State Machine (FIG. 3)

The following algorithm can be used for multi-counter evaluation of a text (step 300) to obtain counter scores for text (step 320). Use an augmented finite-state machine x that corresponds to the multi-counter, and call evaluate(start state x, text location y), with text location y a start location in text.

1) Set state to state x. Set location to location y. Set each counter score to 0.0. Mark each value list "unused." (step 302)

2) If state has an unused value list (step 308), then add values to counters as specified by the value list, and mark the list "used." (step 310)

3) If the location is beyond the end of the text (step 312), then return counter scores and halt (step 320).

4) If the character at the location in text is not in a transition from the state (step 314), then return counter scores and halt (step 320).

5) Set state to the destination of the transition from the present state with the character at the location and advance location (step 316). Go to step 2.

Variations on Construction

For some types of patterns, a pattern-amount pair may be added to an augmented finite-state machine without first converting the pattern to a finite-state machine. Here are descriptions of methods to add two types of patterns. The first type is a pattern that is a single sequence. The second type is a pattern with fixed length and a set of allowed characters for each position.

For a pattern that is a single sequence, it is possible to use an algorithm that transitions through machine states based on the pattern sequence, adding a new state for each pattern position at which there is no transition with the character in the position. To add to a machine x a pattern y from a counter y, use the following algorithm.

add_sequence(state x, pattern y)
1) Set state x to start state of machine x. Set position y to first position in pattern y.
2) Set character y to the character in position y.
3) If character y is not in a transition from state x, then create a new state in machine x and make a new transition, with character y, from state x to the new state.
4) Set destination x to the destination of the transition from state x with character y.
5) If position y is the last position in the pattern, then add (number of counter y, amount of pattern y) to the list of values for destination x. Otherwise, set state x to destination x; set position y to the next position in pattern y, and go to step 2.

The algorithm performs the following steps.
Advance through the machine states as by applying the machine to the sequence as a text.
If the machine would halt when applied to the sequence as a text, then add states and transitions to the machine to prevent halting.
For the final state that would be reached by the machine supplemented with the added states and transitions, form a state value list if the state lacks one, and add to the state value list a reference to the counter and the pattern value.

For a pattern of fixed length with a set of allowed characters for each position, the pattern can be specified as a sequence of allowed character sets, with one set corresponding to each position. For example, pattern ({a, b}, {c, d}) includes ac, ad, bc, and bd. To add a pattern y from a counter y to an augmented finite-state machine x, it is possible to use the following algorithm. Call add_pattern(start state x, first position of pattern y).

add_pattern(state x, position y)
1) Form an initially empty destination state list.
2) If the set of allowable characters in position y that are not in any transition from state x is non-empty, then make a new state in machine x, add transitions from state x to the new state for each character in the set, and add the new state to the destination state list.
3) For each character in the set of allowable characters in position y that are in a transition from state x, add the transition destination to the destination state list.
4) Remove any duplicates from the destination state list.
5) If position y is not the last position in pattern y, then for each state in the destination state list, call add_pattern (state, next position in pattern y).
6) If position y is the last position in pattern y, then for each state in the destination state list, form an empty value list for the state if the state lacks one, and add (number of counter y, amount of pattern y) to the value list for the state.

It is possible to create a finite-state machine for a single counter from finite-state machines for the pattern-amount pairs in the counter as follows. First use an algorithm that constructs an augmented finite-state machine by accumulating the pattern-amount finite-state machines. Then convert each value list to a single value as follows. If a value list for a state has an element, make the value of the element the value of the state. Otherwise, make the value of the state zero.

It is possible to create an augmented finite-state machine by creating single-counter finite-state machines from pattern-amount finite-state machines and then accumulating the single-counter finite-state machines into an augmented finite-state machine. Also, it is possible to first create a set of augmented finite-state machines each corresponding to a partition of the counters in a multi-counter and then merge the machines to create an augmented finite-state machine that corresponds to the multi-counter. To do this, alter the algorithm for accumulating a finite-state machine so that it combines value lists instead of adding a value to a list.

Variations on Scoring Methods

It is possible to accommodate scoring methods other than a sum of amounts for patterns that occur by adjusting how scores are accumulated for each counter. For example, it is possible to store in the state value lists (number of counter, reference to pattern in counter). Then, when accumulating a value list, instead of adding values to counter scores, add references to patterns to counter lists of found patterns. Computing a list of found patterns for each counter supports counter scores based on logical operators, e.g., score 1.0 if pattern 1 and pattern 2 are found, and nonlinear scores, e.g., an amount for pattern 1 if found times an amount for pattern 2 if found.

Variations on Implementation

It is assumed that implementers of the invention can use knowledge of the art of computer science to implement the algorithms using various data structures and operations in ways that are appropriate for specific implementations. Implementation details may be guided by concern for speed or storage, during finite-state machine construction, storage, or application. For example, the list of transitions for each state may be implemented using one of the following options:

A lookup table indexed by character, with a special value that indicates that there is no transition for a character.

A hashtable indexed by character keys.

A list of (character, destination) pairs, ordered by character, which may be searched for a character using binary search.

An unordered list, which may be searched for a character using liner search.

It is possible to use combinations of data structures. For example, if there is a large alphabet, but only the first few characters in the alphabet are commonly used, then it might be appropriate to use a lookup table for the common characters and an ordered list for other characters. It is also possible to convert between data structures during transitions between construction, storage, and application of a finite-state machine.

What is claimed is:

1. A method for constructing a multi-counter finite-state machine augmented with state value lists, said method comprising the computer-implemented steps of:

providing by computer an empty augmented finite-state machine that has only a start state, with no transitions and no value list;

accumulating by computer a finite-state machine of each counter of the multi-counter that corresponds to one or more pattern-amount pairs into the augmented finite-state machine to form a merged machine representing a plurality of single-counter finite-state machines each representing a different one of a plurality of counters and wherein at least one state of the merged finite-state machine each corresponds to a multiplicity of states each of a different one of said single-counter finite-state machines, including converting state values of states of the finite-state machines of the counters of the multi-counter into state-value lists of states of the merged machine, wherein at least one of the state value lists indicates a pattern value for at least two of the plurality of counters, and updating the merged machine with the state-value lists.

2. The method of claim 1, wherein the step of accumulating a finite-state machine of each counter of the multi-counter that corresponds to one or more pattern-amount pairs into the augmented finite-state machine to form a merged machine comprises computer-implemented steps of:

forming states for the merged machine that correspond to pairs of states that can be reached by starting the finite-state machine of a counter of the multi-counter and the augmented finite-state machine in their start states and applying the finite-state machine of the counter and the augmented finite-state machine to a text in unison, with the finite-state machine of the counter and the augmented finite-state machine advancing through each text character simultaneously;

forming states for the merged machine that correspond to one of the finite-state machine of the counter and the augmented finite-state machine having halted while another of the finite-state machine of the counter and the augmented finite-state machine continues to advance through the text;

for each merged machine state, if there is a corresponding state of the augmented finite-state machine of the counter and it has a value list, then copying the value list to form the value list for the merged machine state;

for each merged machine state, if there is a corresponding state of the finite-state machine of the counter, it has a value, and the merged machine state has no value list, then forming a new empty value list for the merged machine state;

for each merged machine state, if there is the corresponding state of the finite-state machine of the counter and it has a value, then adding a reference to the counter corresponding to the finite-state machine and the value, to the value list for the merged machine state;

for each merged machine state with a corresponding first state of the augmented finite-state machine and a corresponding second state of the finite-state machine of the counter, for each character in transitions from both the first and the second states, forming a transition from the merged machine state, with destination of the transition being a state of the merged machine corresponding to the states of the augmented finite-state machine and the finite-state machine of the counter that are the destinations of the transitions from the first and the second states;

for each merged machine state with a corresponding third state of the augmented finite-state machine and a corresponding fourth state of the finite-state machine, of the counter, for each character in a transition from only one of the third and the fourth states, forming a transition from the merged machine state, with destination of the transition being a state of the merged machine corresponding to the state of the augmented finite-state machine or the finite-state machine of the counter that is the destination of the transition from the third or the fourth state and the machine without the transition from the third or the fourth state having halted; and for each merged machine state with a corresponding fifth state of the augmented finite-state machine or a corresponding sixth state of the finite-state machine of the counter but not both, for each character in a transition from the fifth or the sixth state, forming a transition from the merged machine, with destination of the transition being a state of the merged machine state corresponding to the state of the augmented finite-state machine or the finite-state machine of the counter that is the destination of the transition from the fifth or the sixth state and the machine without the transition from the fifth or the sixth state having halted.

3. A method for adding a pattern that consists of a single sequence of characters and a corresponding pattern value, from a counter to an augmented finite-state machine, said method comprising computer-implemented steps of:

providing the pattern;

providing the corresponding pattern value;

providing the augmented finite-state machine having a plurality of machine states and representing a plurality of single-counter finite-state machines each representing a different one of a plurality of counters and wherein at least one state of the augmented finite-state machine each corresponds to a multiplicity of states each of a different one of said single-counter finite-state machines;

advancing through the machine states by applying the machine to the sequence of characters as a text;

if the machine would halt when applied to the sequence of characters as a text, then adding states and transitions to the machine to prevent halting;

forbearing from the adding if the machine would not halt when applied to the sequence of characters as a text;

for a final state that would be reached by the machine supplemented with the added states and transitions, forming a state value list if the final state lacks a state value list, forbearing from forming a state value list if the final state has a state value list, and adding to the state value list a reference to the counter and the pattern wherein at least one of the state value lists indicates a value for at least two of the plurality of counters; and updating the final state of the machine with the state value list.

4. A method for constructing a multi-counter finite-state machine augmented with state value lists, said method comprising the computer-implemented steps of:

providing by computer an empty augmented finite-state machine that has only a start state, with no transitions and no value list;

accumulating by computer a finite-state machine of each counter of the multi-counter that corresponds to one or more pattern-amount pairs into the augmented finite-state machine to form a merged machine, including forming states for the merged machine that correspond to pairs of states that can be reached by starting the finite-state machine of a counter of the multi-counter and the augmented finite-state machine in their start states and applying the finite-state machine of the counter and the augmented finite-state machine to a text in unison, with the finite-state machine of the counter and the augmented finite-state machine advancing through each text character simultaneously;

forming states for the merged machine that correspond to one of the finite-state machine of the counter and the augmented finite-state machine having halted while another of the finite-state machine of the counter and the augmented finite-state machine continues to advance through the text;

for each merged machine state, if there is a corresponding state of the augmented finite-state machine of the counter and it has a value list, then copying the value list to form the value list for the merged machine state;

for each merged machine state, if there is a corresponding state of the finite-state machine of the counter, it has a value, and the merged machine state has no value list, then forming a new empty value list for the merged machine state;

for each merged machine state, if there is the corresponding state of the finite-state machine of the counter and it has a value, then adding a reference to the counter corresponding to the finite-state machine and the value, to the value list for the merged machine state;

for each merged machine state with a corresponding first state of the augmented finite-state machine and a corresponding second state of the finite-state machine of the counter, for each character in transitions from both the first and the second states, forming a transition from the merged machine state, with destination of the transition being a state of the merged machine corresponding to the states of the augmented finite-state machine and the finite-state machine of the counter that are the destinations of the transitions from the first and the second states;

for each merged machine state with a corresponding third state of the augmented finite-state machine and a corresponding fourth state of the finite-state machine, of the counter, for each character in a transition from only one of the third and the fourth states, forming a transition from the merged machine state, with destination of the transition being a state of the merged machine corresponding to the state of the augmented finite-state machine or the finite-state machine of the counter that is the destination of the transition from the third or the fourth state and the machine without the transition from the third or the fourth state having halted; and for each merged machine state with a corresponding fifth state of the augmented finite-state machine or a corresponding sixth state of the finite-state machine of the counter but not both, for each character in a transition from the fifth or the sixth state, forming a transition from the merged machine state, with destination of the transition being a state of the merged machine corresponding to the state of the augmented finite-state machine or the finite-state machine of the counter that is the destination of the transition from the fifth or the sixth state and the machine without the transition from the fifth or the sixth state having halted.

* * * * *